(12) United States Patent
Reis et al.

(10) Patent No.: US 11,783,388 B2
(45) Date of Patent: Oct. 10, 2023

(54) DETECTING USER PREFERENCES OF SUBSCRIPTION LIVING USERS

(71) Applicant: Airbnb, Inc., San Francisco, CA (US)

(72) Inventors: Joao Pedro Carvalho Oliveira de Miranda Reis, San Francisco, CA (US); Cynthia Yue Chen, San Francisco, CA (US); Sara Louise Sodine, San Francisco, CA (US); Heng Ji, Santa Clara, CA (US)

(73) Assignee: Airbnb, Inc., San Francisco, CA (US)

( * ) Notice: Subject to any disclaimer, the term of this patent is extended or adjusted under 35 U.S.C. 154(b) by 259 days.

(21) Appl. No.: 16/802,250

(22) Filed: Feb. 26, 2020

(65) Prior Publication Data

US 2021/0264478 A1 Aug. 26, 2021

(51) Int. Cl.
*G06Q 30/0282* (2023.01)
*G06Q 30/0601* (2023.01)
*G06F 40/205* (2020.01)

(52) U.S. Cl.
CPC ....... *G06Q 30/0282* (2013.01); *G06F 40/205* (2020.01); *G06Q 30/0643* (2013.01)

(58) Field of Classification Search
CPC ............ G06Q 30/0282; G06Q 30/0643; G06F 40/205
USPC ......................................................... 705/347
See application file for complete search history.

(56) References Cited

U.S. PATENT DOCUMENTS

| | | | |
|---|---|---|---|
| 2003/0061145 A1 | 3/2003 | Norrid | |
| 2003/0149576 A1* | 8/2003 | Sunyich | G06Q 10/02 705/5 |
| 2004/0034537 A1 | 2/2004 | Gengarella et al. | |
| 2005/0096946 A1 | 5/2005 | Janakiraman et al. | |
| 2007/0156429 A1* | 7/2007 | Godar | G06Q 10/06 705/5 |

(Continued)

OTHER PUBLICATIONS

Lerttripinyo, Thanatcha, et al. "Accommodation recommendation system from user reviews based on feature-based weighted non-negative matrix factorization method." 2015 12th International Joint Conference on Computer Science and Software Engineering (JCSSE). IEEE, 2015. (Year: 2015).*

(Continued)

*Primary Examiner* — Lynda Jasmin
*Assistant Examiner* — Corey Russ
(74) *Attorney, Agent, or Firm* — Schwegman Lundberg & Woessner, P.A.

(57) ABSTRACT

A system and a method are disclosed for providing specific items in an accommodation for a user. The system may parse an accommodation review for an accommodation left by a subscription living user. The system may determine an item type that the subscription living user mentioned in the accommodation review. The system may identify a specific item for the item type mentioned by the subscription living user. The system may determine that the subscription living user will be staying in a subsequent accommodation. the system may provide, for display to the subscription living user, a rendering of the specific item superimposed on an image of the subsequent accommodation. The system may transmit, automatically in response to the user booking the subsequent accommodation, a request to a vendor to provide the specific item for the subsequent accommodation.

20 Claims, 7 Drawing Sheets

(56) References Cited

U.S. PATENT DOCUMENTS

| | | |
|---|---|---|
| 2008/0052217 A1 | 2/2008 | Etkin |
| 2008/0201178 A1 | 8/2008 | Vizitei |
| 2009/0240679 A1 | 9/2009 | Mehl et al. |
| 2009/0282019 A1* | 11/2009 | Galitsky .................. G06F 40/30 707/999.005 |
| 2009/0313053 A1* | 12/2009 | Gengarella ............ G06Q 10/02 705/5 |
| 2010/0228574 A1 | 9/2010 | Mundinger |
| 2010/0228577 A1 | 9/2010 | Cunningham et al. |
| 2010/0250707 A1 | 9/2010 | Dalley et al. |
| 2011/0071862 A1 | 3/2011 | Cator et al. |
| 2011/0071865 A1* | 3/2011 | Leeds .................. G06Q 10/025 707/E17.014 |
| 2013/0018810 A1 | 1/2013 | Vonallmen |
| 2013/0159883 A1 | 6/2013 | Yerli |
| 2014/0089020 A1 | 3/2014 | Murphy |
| 2014/0114705 A1 | 4/2014 | Bashvitz et al. |
| 2014/0122146 A1 | 5/2014 | Deist et al. |
| 2015/0053121 A1 | 2/2015 | Summerville |
| 2015/0081350 A1 | 3/2015 | Truong |
| 2015/0161719 A1* | 6/2015 | Abhyanker ........ G06Q 30/0645 705/307 |
| 2015/0193739 A1 | 7/2015 | Min et al. |
| 2015/0261844 A1 | 9/2015 | Ramalho |
| 2016/0070709 A1* | 3/2016 | Luan .................. G06Q 30/0282 707/728 |
| 2016/0092798 A1 | 3/2016 | Ikkurty |
| 2016/0132793 A1 | 5/2016 | O'sullivan et al. |
| 2016/0196508 A1 | 7/2016 | Richter |
| 2016/0225108 A1* | 8/2016 | Fishberg ............ G06Q 30/0283 |
| 2016/0328662 A1 | 11/2016 | Vinod et al. |
| 2017/0124575 A1* | 5/2017 | Clark ................ G06F 16/24578 |
| 2017/0200205 A1* | 7/2017 | Liu ........................ G06N 20/00 |
| 2017/0278108 A1 | 9/2017 | Hays et al. |
| 2018/0046944 A1 | 2/2018 | Barbera et al. |
| 2018/0053121 A1 | 2/2018 | Gonzalez et al. |
| 2018/0101793 A1* | 4/2018 | Steinberg ............ G06F 16/9535 |
| 2018/0276578 A1 | 9/2018 | Otillar |
| 2019/0147548 A1 | 5/2019 | Klein et al. |
| 2019/0333119 A1* | 10/2019 | Sweny .................. G06Q 50/12 |
| 2019/0378193 A1* | 12/2019 | Sen ........................ H04L 67/55 |
| 2019/0385096 A1 | 12/2019 | Ibrahim |
| 2020/0027039 A1 | 1/2020 | Miller et al. |
| 2020/0082455 A1 | 3/2020 | Kohli |
| 2020/0118226 A1* | 4/2020 | Agarwal ............ G06Q 20/3278 |
| 2020/0334720 A1 | 10/2020 | Handler et al. |
| 2020/0394728 A1* | 12/2020 | Fishberg ............ G06Q 30/0627 |
| 2020/0396193 A1 | 12/2020 | Mayers |
| 2021/0027340 A1* | 1/2021 | Turner ............... G06Q 30/0282 |
| 2021/0264479 A1 | 8/2021 | Reis et al. |
| 2021/0264481 A1 | 8/2021 | Reis et al. |
| 2021/0264546 A1 | 8/2021 | Reis et al. |

OTHER PUBLICATIONS

Liu, Peiran, Nicolas D. Georganas, and Pierre Boulanger. "Designing real-time vision based augmented reality environments for 3D collaborative applications." IEEE CCECE2002. Canadian Conference on Electrical and Computer Engineering. Conference Proceedings (Cat. No. 02CH37373). vol. 2. IEEE, 2002. (Year: 2002).*

United States Office Action, U.S. Appl. No. 16/802,272, dated Mar. 18, 2022, 21 pages.

United States Office Action, U.S. Appl. No. 16/802,256, dated Mar. 29, 2022, 21 pages.

Akbar, Y. H. et al. "The Sharing Economy and the Future of the Hotel Industry: Transaction Cost Theory and Platform Economics." International Journal of Hospitality Management, vol. 71, Apr. 2018, pp. 91-101.

United States Office Action, U.S. Appl. No. 16/802,234, dated Aug. 2, 2022, 11 pages.

"U.S. Appl. No. 16/802,234, Examiner Interview Summary dated Feb. 28, 2023", 2 pgs.

"U.S. Appl. No. 16/802,234, Final Office Action dated Nov. 9, 2022", 10 pgs.

"U.S. Appl. No. 16/802,234, Response filed Nov. 2, 2022 to Non Final Office Action dated Aug. 2, 2022", 12 pgs.

"U.S. Appl. No. 16/802,256, Examiner Interview Summary dated Mar. 17, 2023", 3 pgs.

"U.S. Appl. No. 16/802,256, Final Office Action dated Oct. 28, 2022", 29 pgs.

"U.S. Appl. No. 16/802,256, Non Final Office Action dated Mar. 29, 2022", 21 pgs.

"U.S. Appl. No. 16/802,256, Response filed Jun. 27, 2022 to Non Final Office Action dated Mar. 29, 2022", 12 pgs.

"U.S. Appl. No. 16/802,272, Examiner Interview Summary dated Feb. 28, 2023", 3 pgs.

"U.S. Appl. No. 16/802,272, Final Office Action dated Oct. 17, 2022", 27 pgs.

"U.S. Appl. No. 16/802,272, Non Final Office Action dated Mar. 18, 2022", 21 pgs.

"U.S. Appl. No. 16/802,272, Response filed Jun. 15, 2022 to Non Final Office Action dated Mar. 18, 2022", 11 pgs.

* cited by examiner

400

```
┌─────────────────────────────────────────────────────────────┐
│  Determine minimum user preferences for an accommodation.   │
│                             410                             │
└─────────────────────────────────────────────────────────────┘
                              │
                              ▼
┌─────────────────────────────────────────────────────────────┐
│  Search for accommodations that meet the minimum user       │
│  preferences.                                               │
│                             420                             │
└─────────────────────────────────────────────────────────────┘
                              │
                              ▼
┌─────────────────────────────────────────────────────────────┐
│  Determine that the accommodation listing database does     │
│  not have an accommodation that meets the minimum user      │
│  preferences.                                               │
│                             430                             │
└─────────────────────────────────────────────────────────────┘
                              │
                              ▼
┌─────────────────────────────────────────────────────────────┐
│  Reserve an accommodation that is modifiable to the         │
│  minimum user preferences.                                  │
│                             440                             │
└─────────────────────────────────────────────────────────────┘
                              │
                              ▼
┌─────────────────────────────────────────────────────────────┐
│  Order furnishings to modify the accommodation to the       │
│  minimum user preferences.                                  │
│                             450                             │
└─────────────────────────────────────────────────────────────┘
```

Parse an accommodation review left by a subscription living user.
510

Determine an item type mentioned by the user in the accommodation review.
520

Identify the specific item for the item type mentioned in the accommodation review.
530

Determine that the user will be staying in a subsequent accommodation.
540

Provide, for display to the user, a rendering of the specific item superimposed on an image of the subsequent accommodation.
550

Transmit, automatically in response to the user booking the subsequent accommodation, a request to a vendor to provide the specific item for the subsequent accommodation.
560

Receive a request from a requesting subscription living user to connect to a similar subscription living user.
610

Execute a similarity algorithm to identify similar subscription living users.
620

Transmit a link to the requesting subscription living user for display on a client device, the link enabling the requesting subscription living user to contact a similar subscription living user without providing personally identifiable information of the similar subscription living user.
630

Connect, in response to an input from the requesting subscription living user to the client device, the requesting subscription living user to one or more similar subscription living users.
640

```
┌─────────────────────────────────────────────────────────────┐
│ Book, for a subscription living user, an accommodation in an │
│      accommodation listing database for a travel itinerary.  │
│                            710                               │
└─────────────────────────────────────────────────────────────┘
                              │
                              ▼
┌─────────────────────────────────────────────────────────────┐
│ Locate, in the accommodation listing database and in response to the │
│ booking, a record of a host accommodation of the subscription living user. │
│                            720                               │
└─────────────────────────────────────────────────────────────┘
                              │
                              ▼
┌─────────────────────────────────────────────────────────────┐
│ Modify, automatically in response to the locating, a status of the record in │
│   the accommodation listing database to be a searchable record. │
│                            730                               │
└─────────────────────────────────────────────────────────────┘
                              │
                              ▼
┌─────────────────────────────────────────────────────────────┐
│ Adjusting automatically the status of the record in response to the │
│ subscription living user making a change in the travel itinerary. │
│                            730                               │
└─────────────────────────────────────────────────────────────┘
```

FIG. 7

DETECTING USER PREFERENCES OF SUBSCRIPTION LIVING USERS

CROSS REFERENCE TO RELATED APPLICATIONS

This application is related to U.S. application Ser. No. 16/802,234, entitled "ACCOMMODATION FURNISHING BASED ON SUBSCRIPTION LIVING USER PREFERENCES," and to U.S. application Ser. No. 16/802,256, entitled "CONNECTING SIMILAR SUBSCRIPTION LIVING USERS," and to U.S. application Ser. No. 16/802,272, entitled "AUTO-LISTING AN ACCOMMODATION OF A SUBSCRIPTION LIVING USER," all filed on an even date herewith and which are is incorporated by reference herein in their entirety.

TECHNICAL FIELD

The disclosure generally relates to the field of accommodation management systems, and, more particularly, to facilitating interactions with accommodation management systems.

BACKGROUND

Some individuals prefer to change accommodation locations frequently. Whether on a temporary (e.g., vacation) or a permanent (e.g., nomadic lifestyle) basis, such individuals often book each accommodation individually. However, it can be difficult for the traveler to identify an accommodation at each desired location which meets the traveler's desired specifications, such as price, size, furniture, location, etc. Furthermore, given the unique preferences of different users, it may be unlikely that many, if any, available accommodations meet all of a user's preferred specifications. Moreover, a process automating bookings based on observed patterns also would be highly desirable.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 depicts a process for furnishing an accommodation in accordance with an embodiment.

FIG. 5 depicts a process for determining user preferences for a subscription living user in accordance with an embodiment.

FIG. 6 depicts a process for connecting similar subscription living users in accordance with an embodiment.

FIG. 7 depicts a process for auto-listing an accommodation of a subscription living user in accordance with an embodiment.

DETAILED DESCRIPTION

Figure 1:
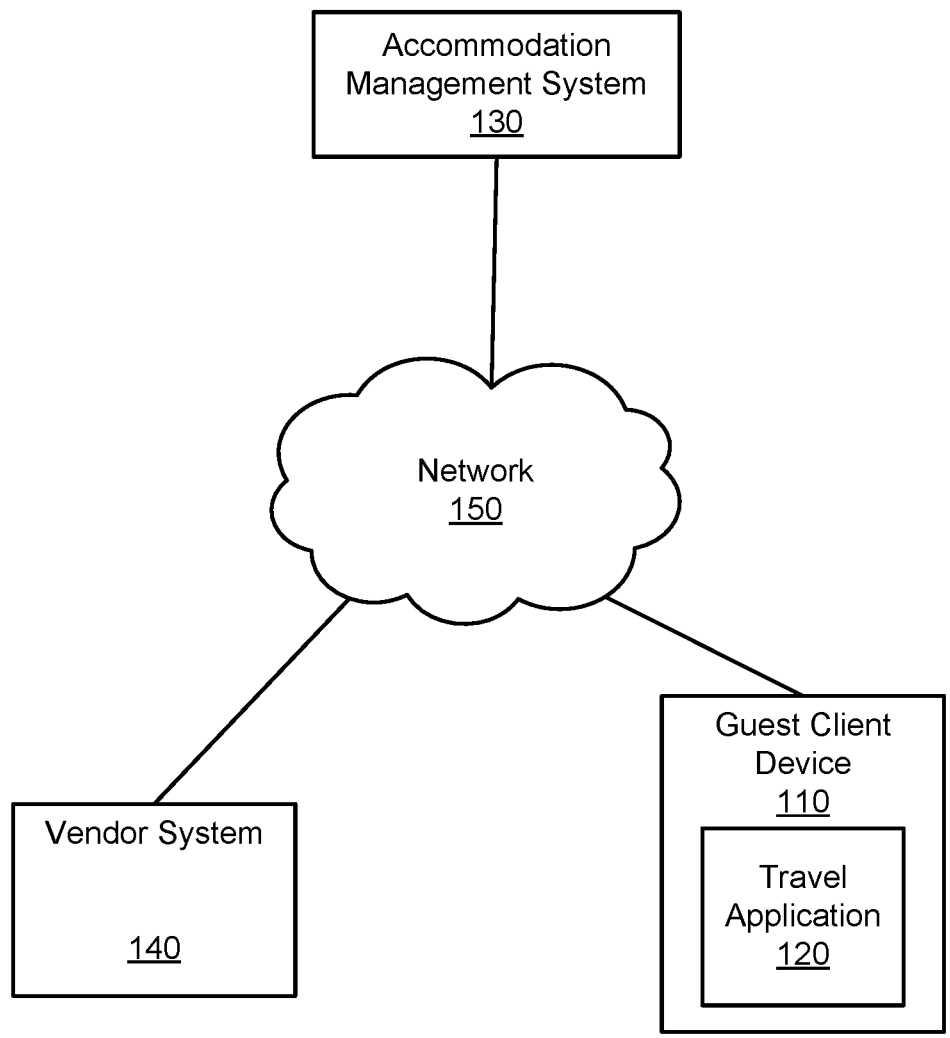
FIG. 1 illustrates one embodiment of a network environment for components of an accommodation management system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One example embodiment of a disclosed system, method and computer readable storage medium includes managing accommodations for subscription living users. Subscription living users may pay a fee, which may be a fixed monthly fee, in exchange for flexible accommodations with an accommodation management system. For some users, the users may not maintain a primary residence, and the users may live at a series of temporary accommodations provided by the accommodation management system. The flexibility of a subscription living service allows users to experience different accommodations and locations while paying a fixed cost. The systems, methods, and computer readable storage media disclosed herein facilitate the subscription living lifestyle by managing bookings for users, selecting accommodations that meet user criteria, and facilitating other aspects of the subscription living lifestyle.

A system and a method are disclosed for providing furnishings for an accommodation based on user preferences. An accommodation management system may retrieve, from a user preference database, minimum user preferences for an accommodation for a subscription accommodation user. The system may query an accommodation listing database for accommodations that meet the minimum user preferences. The system may determine that the accommodation listing database does not have an accommodation that meets the minimum user preferences. The system may reserve an accommodation that is modifiable to meet the minimum user preferences. The system may order automatically, in response to the reserving, furnishings to meet the minimum user preferences.

A system and a method are disclosed for providing specific items in an accommodation for a user. The system may parse an accommodation review for an accommodation left by a subscription living user. The system may determine an item type that the subscription living user mentioned in the accommodation review. The system may identify a specific item for the item type mentioned by the subscription living user. The system may determine that the subscription living user will be staying in a subsequent accommodation. the system may provide, for display to the subscription living user, a rendering of the specific item superimposed on an image of the subsequent accommodation. The system may transmit, automatically in response to the user booking the subsequent accommodation, a request to a vendor to provide the specific item for the subsequent accommodation.

A system and a method are disclosed for connecting similar subscription users. The system may receive a request from a requesting subscription living user to connect to a similar subscription living user. The system may execute a similarity algorithm to identify one or more similar subscription living users, wherein the similarity algorithm calculates a similarity score between the requesting subscription living user and the one or more similar subscription living users. The system may transmit a link to the requesting subscription living user for display on a client device of the requesting subscription living user, the link enabling the requesting subscription living user to contact a similar subscription living user of the one or more similar subscription living users without providing personally identifiable information of the similar subscription living user. The system may connect, in response to an input from the requesting subscription living user to the client device, the requesting subscription living user to the one or more similar subscription living users.

A system and a method are disclosed for auto-listing a subscription living user's host accommodation. The system may book, for a subscription living user, an accommodation in an accommodation listing database for a travel itinerary. The system may locate, in the accommodation listing database and in response to the booking, a record of a host accommodation of the subscription living user. The system may modify, automatically in response to the locating, a status of the record in the accommodation listing database to be a searchable record. The system may adjust automatically the status of the record in response to the subscription living user making a change in the travel itinerary.

Accommodation Management System Environment

FIG. 1 illustrates one embodiment of a network environment for components of an example accommodation management system. Environment 100 includes guest client device 110, accommodation management system 130, vendor system 140, and network 150. Though only one guest client device 110 is shown in FIG. 1, other embodiments may use more than one guest client device 110. Each system and device of FIG. 1 may include a subset or all the components of a computing system or machine, e.g., as further described in FIG. 3.

Guest client device 110 may be a client device of a traveler user of accommodation management system 130. The term traveler, as used herein, refers to a user of accommodation management system 130 that books an event. The user may have a user account on the accommodation system through which electronic transactions and communications may be conducted between the client device 110 and the accommodation management system 130. The term client device may refer to a computing device such as a smartphone, tablet, smartwatch, laptop, computer, or any other device that can interact with the accommodation management system 130 over network 150 consistent with the interactions described herein.

Guest client device 110 may include travel application 120. The term application, when used in connection with accommodation management system 130, may refer to an application capable of carrying out actions relating to use of accommodation management system 130 that are described herein. Examples of such actions include outputting listings to provide for display on a screen of a computing device, completing a booking of a listed accommodation, outputting notifications, determining a location of a client device, communicating with third-party systems via application programming interfaces, completing a check-in or check-out process, commanding an entry to an accommodation to unlock, and the like. In some embodiments, guest client device 110 includes one or more instances of a travel application 120 associated with accommodation management system 130. Any number of client devices may be included in environment 100; the depiction of only guest client device 110 is merely for convenience and ease of explanation.

Vendor system 140 is configured to provide services for an accommodation. For example, vendor system 140 may be operated by furniture rental company, a floral company, a grocery delivery company, a restaurant, a landscaping company, a housecleaning company, a laundry company, etc. Vendor system 140 may maintain a list of amenities that may be provided by third-party vendors. Users may select optional furnishings and services from the list for one or more accommodations.

Network 150 may be any suitable communications network for data transmission. In an embodiment such as that illustrated in FIG. 1, network 150 uses standard communications technologies and/or protocols and can include the Internet. In another embodiment, the entities use custom and/or dedicated data communications technologies. Network 150 connects guest client device 110, vendor systems 140, and any other client device, to accommodation management system 130 such that guest client device 110, vendor systems 140, and accommodation management system 130 can transmit data back and forth.

Accommodation management system 130 facilitates activity relating to listing, booking, and physically accessing subscription living accommodations. Further details relating to such activities are described throughout with reference to FIGS. 2-7 below.

Example Accommodation Management System Configuration

Figure 2:
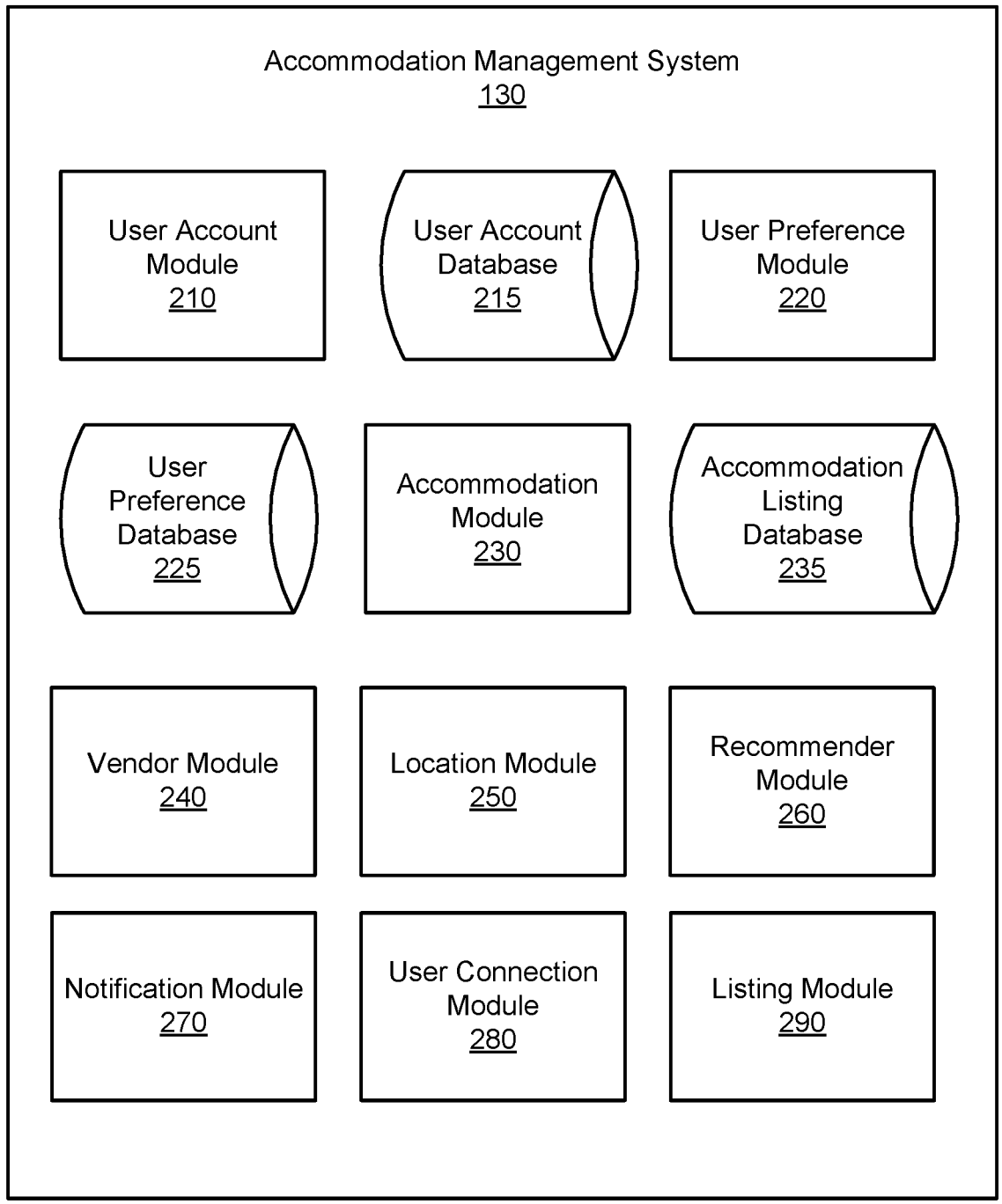
FIG. 2 illustrates one embodiment of modules used by an accommodation management system.

FIG. 2 illustrates one embodiment of modules and databases used by an example accommodation management system, e.g., accommodation management system 130. Accommodation management system 130 may include user account module 210, user preference module 220, accommodation module 230, vendor module 240, user connection module 250, recommender module 260, and location module 270. The modules may correspond to computer program code (or instructions) that when executed by a computing device (e.g., processor) executes the functionality described. It is noted that some modules may be combined in some example embodiments.

User account module 210 is configured to create and store an electronic record for a user in user account database 215. The electronic record may include username, password, financial transaction information, user presentation preferences (e.g., user interface preferences), accommodation preferences, wish lists or notes, itinerary information, reminder frequency details and other information from within or for use with accommodation management system 130. The system may require some base electronic record information (e.g., username and password) for interaction with the system. Further, the electronic record may be stored in a secured (e.g., encrypted) manner in user account database 215.

User account module 210 is further configured to store an account tier for a user in user account database 215. The user may select a subscription model to use accommodation management system 130. For example, the user may select to pay $2,000 per month to receive unlimited stays at accommodations managed by accommodation management system 130. Different subscription tiers may allow the user access to different accommodations or different numbers of allowable stays per month or year. For example, a bronze level tier may allow the user to stay in any economy accommodations for up to ten days per month. A silver tier may allow the user to stay in any economy accommodations for any number of days per month. A gold tier may allow the user to stay in any economy or premium accommodations for any number of days per month.

In some embodiments, a high tier, such as a gold tier, may allow a user to acquire equity in one or more accommodations based on a number of user stays. For example, for each night a gold tier user stays in an accommodation, the user may obtain a 0.01% equity stake in a pool of accommodations owned by accommodation management system 130.

User preference module 220 is configured to detect accommodation preferences of a user. The accommodation preferences may be stored in a record for the user in user preference database 225. The accommodation preferences may include tier, price, size, furniture, location, internet speed, television channels, weather, toiletries, cookware, linens, view, amenities, food options, noise level, design style, nearby activities, or any other suitable preference which may affect the user's satisfaction with an accommodation. User preference module 220 may obtain some user preferences from user account database 215. For example, user account database 215 may contain preferences input by the user and stored in the user's electronic record, and user preference module 220 may retrieve the preferences from user account database 215.

User preference module 220 may infer some user preferences. For example, user preference module 220 may review previous accommodations selected by the user and identify common traits between the previous accommodations, such as that the user always selects accommodations with a king size bed. User preference module 220 may parse accommodation reviews left by the user for previous accommodations. The reviews may be stored in user account database 215 and/or accommodation listing database 235. User preference module 220 may detect favorable or unfavorable comments from the user for item types mentioned in the user's accommodation reviews. An item type may be a generic item, such as bed sheets, oven, television, etc. For example, an accommodation review may indicate that the user liked the brand and thread count of the bed sheets. User preference module 220 may identify the specific item mentioned by the user. The specific item may include, e.g., the brand, model number, size, etc. of the item type, and user preference module 220 may create a user preference for the user regarding a preferred brand and thread count by updating the user's record in user preference database 225. In some embodiments, user preference module 220 may utilize natural language processing systems to analyze the text of reviews left by the user and detect favorable and unfavorable comments regarding specific items. In some embodiments, user preference module 220 may detect preferences based on search terms or filters utilized by a user when searching for accommodations in accommodation management system 130. For example, user preference module 220 may detect that a user filtered available accommodations based on the accommodations having a hair dryer and crib, and that the user entered the search term "workspace." User preference module may store the filters and search terms as user preferences in user preference database 225, and the user preferences may be utilized for subsequent accommodations for the user, without the user reentering the filters and search terms. User preference module 220 may identify and store preference tiers for each identified feature in the user's record in user preference database 225. For example, user preference module 220 may determine that a user prefers a premium view, standard furniture, and economy linens.

User preference module 220 may infer accommodation themes and provide suggestions based on the inferred theme. The theme may apply to accommodations, services, nearby amenities, etc. For example, user preference module 220 may determine that the user prefers accommodations having bathrobes, whirlpool tubs, and champagne service, and user preference module 220 may determine that the user prefers romantic themed accommodations and/or services. In another example, user preference module 220 may determine that the user prefers accommodations that include high-end stereo systems and that are located near concert venues, and user preference module 220 may determine that the user prefers music themed accommodations and/or services. User preference module 220 may subsequently recommend accommodations or services that include attributes related to the identified themes. Other themes may include, for example, shopping, sporting activities (e.g., skiing, golf), family-friendly, oenophile, eco-friendly, birthday, sporting events, movies, outdoor activities (e.g., camping, backpacking), pets, etc.

User preference module 220 may store template themes in user preference database 225. A template theme is a list of furnishings that are not user-specific. For example, user preference module 220 may store themes related to, for example, shopping, sporting activities (e.g., skiing, golf), family-friendly, oenophile, eco-friendly, birthday, sporting events, movies, outdoor activities (e.g., camping, backpacking), pets, etc. The user may be able to select a template theme to pre-populate accommodation preferences. In some embodiments, users may use a template theme as a starting point, and the user may modify the template theme to the user's preferences. In some embodiments, in response to a user selecting a template theme, user preference module 220 may modify the template theme according to the user's stored preferences. For example, a "golf" template theme may include a room with two queen beds, but the user's stored preferences may indicate that the user prefers king beds, and user preference module 220 may modify the template theme for the user to include a room with one king bed.

User preference module 220 may detect minimum criteria and flexible criteria for the user. Minimum criteria are criteria which are required by the user. For example, the user may only be willing to stay in accommodations that have a kitchen. Flexible criteria are criteria that are preferred by the user, but not required. For example, the user may prefer accommodations that have a kitchen, but the user may be willing to stay in accommodations that do not have a kitchen if other criteria meet or exceed the user's preferences.

User preference module 220 may create one or more layout profiles for a user and store the layout profiles in user preference database 225. A layout profile may comprise a list of furnishings for a user. As used herein, "furnishings" refers to any item or service provided at an accommodation (e.g., furniture, appliances, items, linens, laundry service, meal delivery service, utilities, etc.) A user may be associated with multiple layout profiles. In some embodiment, each of a user's layout profiles may comprise a different theme, such as romantic, birthday, work, girls trip. For example, a work layout profile may include a desk, high-speed internet, and quiet surroundings as necessities. In some embodiments, a user may explicitly create one or more layout profiles. In some embodiments, user preference module 220 may create layout profiles on behalf of the user based on previous preferences selected by the user. When selecting a subsequent accommodation, the user may select one of the layout profiles to be utilized for the accommodation. In some embodiments, the user may transmit the layout profile to other users to user for their accommodation bookings.

Additionally, when leaving a review of an accommodation, accommodation management system 130 may attach the layout profile used by the user to the review, to better inform users reading the review about what elements the user enjoyed.

Accommodation module 230 is configured to identify suitable accommodations for a user. Accommodation module 230 may store a list of available accommodations in accommodation listing database 235. An accommodation may be any unit made available by a host user, including, for example, a private residence, a portion of a private residence, a campsite, a bed in a hostel, a recreational vehicle, a hotel unit of many hotel units made available from a central source—namely, the proprietor of a hotel, etc.

In some embodiments, accommodation module 230 is configured to receive a travel itinerary and identify accommodation locations in the travel itinerary. The travel itinerary may be input by a user into a client device, such as guest client device 110 of FIG. 1. The user may book one or more accommodations using accommodation management system 130. Additionally, the user may input itinerary-specific preferences. For example, the user's stored preferences may indicate that the user prefers economy accommodations, but the user may input specific preferences for the itinerary which may indicate that the user prefers premium accommodations for the specific travel itinerary.

Accommodation module 230 may obtain the user preferences form user preference module 220. Accommodation module 230 may query accommodation listing database 235 for available accommodations and identify accommodations which match all or some of the user preferences. Accommodation module 230 may first search for accommodations which meet both the user's minimum criteria and the user's flexible criteria. Accommodation module 230 may subsequently search for accommodations which meet the user's minimum criteria but do not necessarily meet the user's flexible criteria. An accommodation is a match with all of the user preferences if each of the features of the accommodation is at least as high as the user preferences. For example, if a user preference for a first feature is "economy," the accommodation may still be a match if the accommodation is "premium" for the first feature.

In some embodiments, accommodation module 230 may determine that no accommodations in accommodation listing database 235 match the user preferences. Accommodation module 230 may be configured to identify an accommodation in accommodation listing database 235 which may be modified to match the user preferences. For example, accommodation module 230 may determine that an accommodation matches all user preferences except for the user's linen preferences. Accommodation module 230 may determine that the accommodation may be modified by obtaining different linens. In some embodiments, accommodation module 230 may identify an at least partially unfurnished accommodation which may be furnished to meet the user's preferences.

In some embodiments, accommodation module 230 may present the accommodation to the user with an indication that modifications are available to meet the user's preferences. In other embodiments, accommodation module 230 may present the accommodation to the user as a match without indicating that modifications will be made to meet the user's preferences. Thus, the accommodation may be modified to the user's preferences without the user's input or knowledge. In some embodiments, accommodation module 230 may present images for display to the user on the user interface of the guest client device 110 with and/or without the modifications. For example, accommodation module 230 may present an image of an accommodation as currently furnished, and accommodation module 230 may present an image of the accommodation with the images of the user's preferred furnishings superimposed on the image. In some embodiments, accommodation module 230 may receive user input to the superimposed images (e.g., based on the user tapping on the superimposed images on a touchscreen user interface) indicating modifications which are approved, necessary, or unnecessary for the user. In some embodiments, accommodation module 230 may automatically book an accommodation for the user in response to finding an accommodation that matches or may be modified to match the user's preferences. In some embodiments, accommodation module 230 may transmit a trigger to vendor module 240 to automatically provide the modifications to the accommodation in response to booking the accommodation for the user.

In some embodiments, accommodation module 230 may identify an accommodation that meets a user's criteria for a future accommodation. A user may provide specific dates and/or specific user preferences for a future accommodation. In response to an accommodation in accommodation listing database 235 becoming available that meets the user criteria, accommodation module 230 may instruct notification module 270 to notify the user that the accommodation is available. For example, a user may select one specific accommodation that is currently unavailable, and the user may request to be notified or automatically book the accommodation when the accommodation becomes available. In another example, the user may select multiple potential accommodations, or the user may select specific amenities, and accommodation module 230 may automatically book the accommodation or instruct notification module 270 to notify the user when an accommodation meeting the criteria becomes available.

Vendor module 240 is configured to coordinate with vendors to modify an accommodation to a user's preferences. In response to a user booking an accommodation, vendor module 230 may retrieve from accommodation listing database 235 a list of items for the accommodation which should be modified to meet the user's preferences. For example, vendor module 240 may determine that furniture should be ordered from a furniture rental company, linens should be ordered from a laundry service, and groceries should be ordered from a food delivery service. In some embodiments, vendor module 240 may provide the user with a list of available items or services that are available to be added to the accommodation. The user may select from the list to furnish the accommodation. In some embodiments, one or more vendors may be third-party vendors external to accommodation management system 130. In other embodiments, the vendors may be operated or owned by a common owner as accommodation management system 130. The items may be ordered by vendor module 240 via application programming interfaces (APIs) that may couple to the external vendors. In some embodiments, vendor module 240 may automatically transmit an API request to external vendors to obtain the modified items or services in response to a trigger from accommodation module 230 indicating that accommodation module 230 has booked the accommodation.

In some embodiments, vendor module 240 may determine that it is unfeasible or cost-prohibitive to obtain the items to meet the user's preferences. Accommodation management system 130 may inform the user that the specific item is unavailable, and accommodation management system 130 may provide the user with the opportunity to select a different accommodation, receive a discount on the selected accommodation, or pay a premium to obtain the cost-prohibitive item.

Location module 250 is configured to detect the location of the traveler and other objects. Location module 250 may receive a global positioning system (GPS) location from the traveler's client device which indicates a location of the traveler. The user may opt-in to allow location module 250 to detect the user's location. In some embodiments beacons, such as BLUETOOTH beacons, may be positioned in various locations, such as at the entrances and exits to airports, accommodations, or other locations, and the beacons may detect the location of the traveler's client device in response to the traveler's client device being within a radius, such as a predefined radius (e.g., five-meter radius), of the beacon. The beacon or the user's client device may transmit a notification to location module 250 that the traveler's client device is near the beacon. In some embodiments, beacons may be located on moveable objects, such as the traveler's luggage, cars, bicycles, keys, etc., in order to detect whether the traveler is within the radius of the moveable objects.

Recommender module 260 is configured to provide a recommendation to a user regarding an accommodation. For example, based on a determination that the user is in need of accommodation, recommender module 260 may transmit a list of recommended accommodations or a recommendation of a specific accommodation that meets the user's preferences to the user for display to the user on the user's client device. Recommender module 260 may determine that the user is in need of an accommodation via a variety of methods. For example, the user may explicitly request an accommodation, and in response, recommender module 260 may query accommodation listing database 235 for available accommodations that meet the user's preferences. In some embodiments, recommender module 260 may query vendor module 240 for information regarding transportation to accommodations listed in accommodation listing database 235. Recommender module 260 may incorporate the cost, length of time, and convenience of obtaining transportation to various accommodations when selecting recommended accommodations for the user. For example, when determining the cost of a recommended accommodation, recommender module 260 may add the cost of the accommodation itself, the cost of transportation, and the cost of moving expenses to determine the total cost for the user. In response to the user accepting a recommended accommodation, recommender module 260 may coordinate with vendor module 240 to schedule any desired vendor services (e.g., ground and air transportation, packing and moving services, cleaning services, etc.), to facilitate all aspects of the move to the subsequent accommodation.

In some embodiments, recommender module 260 may implicitly determine that the user may desire an accommodation without specific prompting from the user. For example, recommender module 260 may determine based on a location obtained from location module 250 that the user is in a new city, at a baggage claim of an airport, more than a predefined distance away from a previous accommodation, etc., and based on the location determine that the user may desire a new accommodation. In response, recommender module 260 may query accommodation listing database 235 for available accommodations near the current location of the user that meet the user's preferences.

In some embodiments, recommender module 260 may determine that the user may wish to check out of an accommodation. In some embodiments, the user may explicitly request a checkout, and accommodation module 230 may check the user out of the accommodation. However, in some embodiments, recommender module 260 may implicitly determine that the user may desire to checkout of an accommodation without specific prompting from the user. For example, recommender module 260 may determine based on one or more locations obtained from location module 250 that the user is more than a predefined distance (e.g. twenty miles) away from a current accommodation, and recommender module 260 instruct notification module 250 to query the user as to whether they would like to checkout of the accommodation. In some embodiments, recommender module 260 may automatically check the user out of the accommodation in response to determining that the user would like to check out of the accommodation. Recommender module 260 may instruct accommodation module 230 that the accommodation is available.

In some embodiments, recommender module 260 is configured to recommend events to a user. The events may comprise: travel events, such as flights or ground transportation; food events, such as restaurant recommendations or grocery deliveries; sightseeing events, such as tours; medical events, such as suggested doctor or dentist offices; or any other suitable event. Recommender module 260 may select recommended events based on the user's previous event history, preferences indicated by the user, ratings on third-party systems, suggestions from other users with similar characteristics, etc. In some embodiments, recommender module 260 comprises a machine learning system that is trained using travel and experience histories from many users. The machine learning system may use user ratings or reviews for previous events utilized by the user or other user as inputs to train a machine learning model. For example, a review containing positive words for an event may indicate that the event is a positive event, and a review containing negative words for an event may indicate that the event is a negative event. The machine learning system may subsequently identify events that are likely to be positive for the user based on the machine learning model.

Notification module 270 is configured to provide notifications to the user regarding scheduled or suggested accommodations. The notifications may be transmitted for display on the user's client device via short message service (SMS), electronic mail (email), push notifications, phone calls, or any other suitable communication method. The notifications may indicate that an accommodation has been found, that an accommodation stay has started, that an accommodation stay has ended, that recommender module 260 has a recommendation, or any other information that may be useful to the user.

User connection module 280 is configured to connect similar users. A requesting user may request to be connected to a similar user. Similar users may be two users who share one or more characteristics. The characteristics may include user preferences, subscription tiers, demographic information (e.g., age, sex, salary, residence location, marital status, etc.), travel history, future travel itineraries, occupation, expertise (e.g., degree in a specific field), experience (e.g., lived in a specific city for a particular length of time), etc. The requesting user may wish to obtain information regarding a future accommodation, location, or experiences from a similar user who recently stayed in the accommodation or location. The requesting user may wish to identify similar users as potential roommates or to create communities of similar users in a city.

User connection module 280 may query user account database 215 for similar users. The query may include the user characteristics, a sequence of locations visited or planned to be visited by the user, user preferences for each location, etc. User connection module 280 may execute a similarity algorithm to determine a similarity between users. The similarity algorithm may calculate a similarity score between users. As one example, user the similarity algorithm may assign one point for each matching user preference and one point for each matching characteristic. The similarity score between the two users may be the sum of the points. Those skilled in the art will recognize that many different algorithms may be used to calculate a similarity score, including machine learning algorithms. The machine learning algorithm may be continuously improved by determining whether the user connected to a suggested similar user, and updating the machine learning model. User connection module 280 may identify one or more users having the highest similarity scores as the requesting user who have stayed in the relevant accommodations or locations for the requesting user.

In some embodiments, user connection module 280 may identify a similar user for a requesting user without an explicit request from the requesting user. For example, user connection module 280 may determine that the requesting user is planning to travel to Milwaukee, and user connection module 280 may identify a similar user who recently traveled to Milwaukee. User connection module 280 may instruct notification module 270 to query the requesting user whether they would like to be connected to the similar user. The requesting user may be connected to the similar user by a variety of methods. For example, user connection module 280 may provide the requesting user with a link to email, message, or call the similar user without providing the similar user's actual email address, phone number, or other personally identifiable information. In some embodiments, user connection module 280 may provide an image or description of the similar user for display on the requesting user's client device, and the requesting user may connect to the similar user by tapping on the description of the similar user. In some embodiments, user connection module 280 may not connect the two users unless both users accept the connection. User connection module 280 may provide information to each user about the other user which allows the users to make a decision as to whether to connect, without providing any personally identifiable information. For example, user connection module 280 may provide the age and similar characteristics of a potential connection without sharing any additional information. In response to both users accepting the connection, user connection module 280 may provide additional information, such as name, email address, etc.

In some embodiments, user connection module 280 may initiate a group chat or group SMS conversation including the requesting user and one or more similar users. The group chat may include one or more icebreaking questions from user connection module 280, such as, "USER is your age and will be visiting Paris next week. Do you have recommendations on where they should eat or stay?" User connection module 280 may also provide the requesting user with a list of matched characteristics between the requesting user and the similar user which may assist the requesting user in initiating a conversation and asking relevant questions to the similar user.

In some embodiments, user connection module 280 may provide a requesting user with a roommate suggestion. User connection module 280 may identify similar characteristics between users which may create a successful roommate match. For example, user connection module 280 may determine that two users prefer similar amenities for an accommodation, and user connection module 280 may notify the users that they may be a suitable roommate match. In some embodiments, user connection module 280 may identify different but complementary preferences between users that may create a successful roommate match. For example, an accommodation may include one firm mattress and one plush mattress, and, for a requesting user who prefers firm mattresses, user connection module 280 may identify potential roommates who prefer plush mattresses.

In some embodiments, user connection module 280 may recommend users who may be successful matches for a user community. A user may be new to an area, or unfamiliar with the area, and the user may wish to be connected to users with similar characteristics to explore the area. In response to a request from a requesting user, user connection module 280 may suggest one or more similar users to the requesting user who have similar characteristics and may be interesting in joining a community.

In some embodiments, user connection module 280 may inform connected users what formed the basis for the connection. User connection module 280 may identify one or more matching or complementary characteristics. User connection module 280 may instruct notification module 270 to transmit a notification to the users describing the similar or complimentary characteristics. For example, a notification to a requesting user may state, "You connected with USER1 because you and USER1 both like sailing." User connection module 280 may provide the requesting user to accept or decline the connection. Additionally, user connection module 280 may query the requesting user whether the requesting user would like additional connections based on the similar characteristic identified by user connection module 280. For example, user connection module 280 may query the user, "Would you like to be connected to additional users who like sailing?"

Listing module 290 is configured to list a user's property that may have a form of accommodation available (e.g., a house, condominium, camper) as an available accommodation in response to the user providing access to that property temporarily. The user may indicate that all or a portion of the accommodation may be available in response to the user providing access to the accommodation. The user may be enrolled in a subscription accommodation service with accommodation management system 130. The user may select an option to auto-list the user's home in response to the user booking a different accommodation. In response to the user booking an accommodation through accommodation management system 130, accommodation module 230 may provide travel start and end dates to listing module 280. In some embodiments, accommodation 230 may provide a start date and an open-ended end date to listing module. In some embodiments, the user may provide additional dates to accommodation management system 130 when the user will or will not have the property available for any reason.

By way of example, the listing module 290 may indicate to accommodation module 230 that the user's home is available for booking from the user's travel start date to the end date. Listing module 290 may provide updates to accommodation module 230 in response to the user modifying the user's travel plans. For example, the user may book an additional accommodation extending the end date, and accommodation module 230 may continue listing the user's home as an available accommodation for the extended time. In some embodiments, the user may change the travel end date to be sooner than expected. Listing module 290 may instruct notification module 270 to notify any guests that are staying in the user's home that the guests must leave the user's home by the shortened end date. Accommodation module 230 may automatically re-book the guests in a different accommodation in response to the user returning home at the shortened travel end date. In some embodiments, prior to booking, accommodation module 230 may inform guests booking the user's home that there is a possibility that the guests' stay may be cut short and provide the guests an option to book a different accommodation. Thus, listing module 290 allows the user to automatically list the user's home while it is not being used, while maintaining flexibility to the user to return home when desired by the user.

In some embodiments, listing module 290 is configured to automatically list an accommodation in response to a guest user checking out of the accommodation. The checkout may be an explicit checkout submitted by the guest, or a checkout inferred by accommodation management system, such as in response to the guest booking a different accommodation or leaving the physical area of the accommodation. Listing module 290 may prevent a record of the accommodation in accommodation listing database 235 from showing as active while the guest user is staying in the accommodation. In response to the guest user checking out of the accommodation, listing module may update the status of the record to active in accommodation listing database 235, such that other users may view the record. In some embodiments, the record may be shown as active after a scheduled checkout date of the guest user. However, in response to a change in the guest user's end date in the accommodation, listing module 290 may instruct accommodation listing database 235 to update the status of the record. In the event that the guest user has extended the length of stay, and a subsequent guest is scheduled to stay in the accommodation, accommodation module 230 may automatically rebook the subsequent guest for a different accommodation.

Computing Machine Architecture Example

Figure 3:
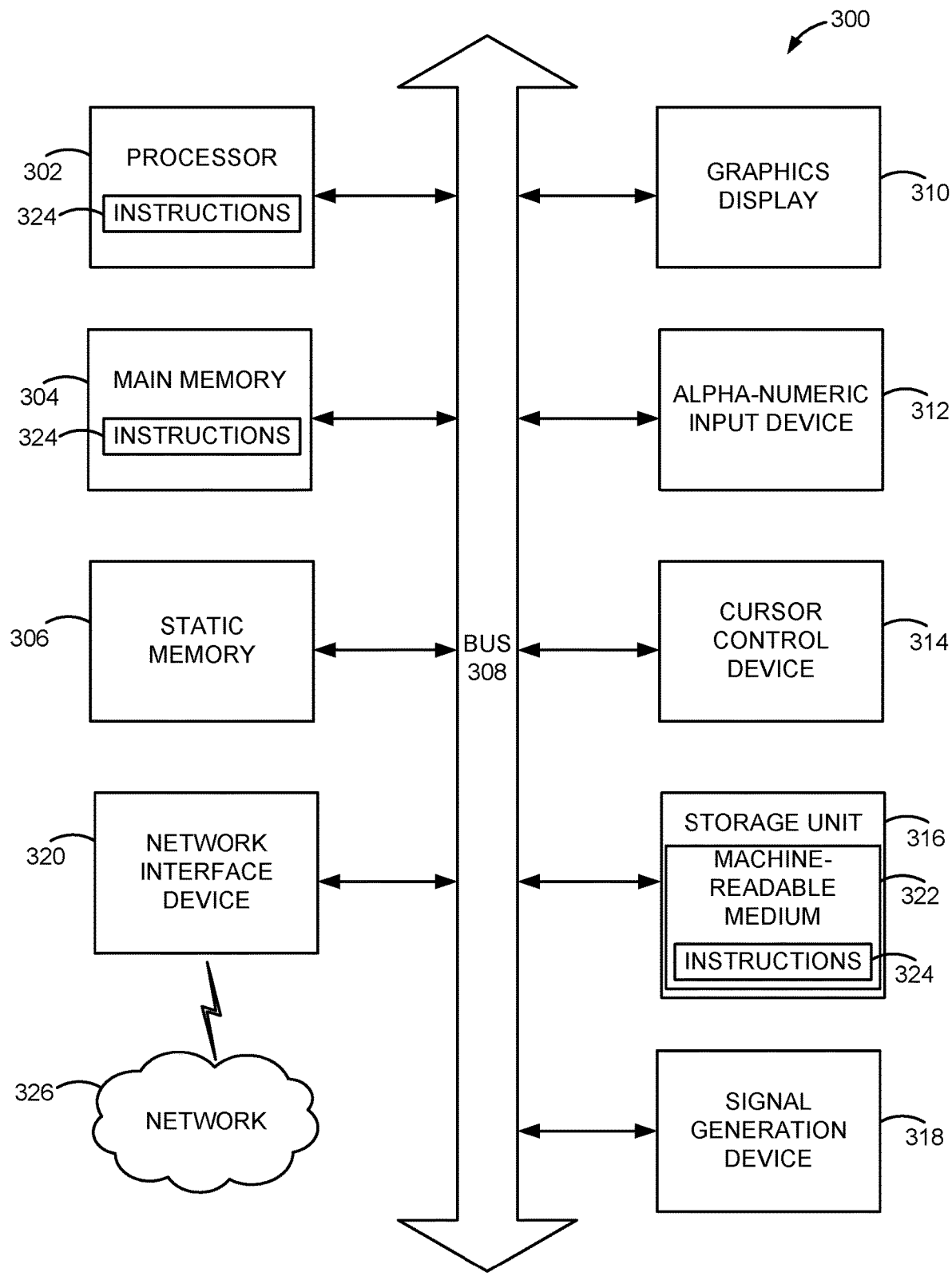
FIG. 3 is a block diagram illustrating components of an example machine able to read instructions from a machine-readable medium and execute them in a processor (or controller).

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions (software or program code) 324 executable by one or more processors 302. The devices and system described in FIG. 1 may have a subset or all the components described with FIG. 3. The modules described in FIG. 2 may be embodied as instructions that make up software or program code. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a smartwatch, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alphanumeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but is not limited to, data repositories in the form of solid-state memories, optical media, and magnetic media.

Example Subscription Living Accommodation Management Processes

FIG. 4 depicts an example process 400 for furnishing an accommodation according to user preferences, in accordance with one or more embodiments. In this example, the accommodation management system 130 determines 410 minimum user preferences for an accommodation. The user preferences may be stored in a user preference database 225 of the accommodation management system 130, and the accommodation management system 130 may retrieve a first set of minimum user preferences from the user preference database 225. In some embodiments, the user preference module 220 may determine a second set of minimum user preferences based on the content of accommodation reviews left by the user, which the user preference module 220 may retrieve from an accommodation listing database 235. In some embodiments, accommodation management system 130 may identify common features between the first set of minimum user preferences and the second set of minimum user preferences. In some embodiments, the user may input one or more preferences to the accommodation management system 130. In some embodiments, the user may book accommodations through the accommodation management system 130, and the accommodation management system 130 may determine minimum user preferences based on features of the accommodations booked by the traveler. The minimum user preferences may include tier, price, size, furniture, location, internet speed, television channels, weather, toiletries, cookware, linens, view, amenities, food options, noise level, design style, nearby activities, or any other suitable preference which may affect the user's satisfaction with an accommodation. In some embodiments, the minimum user preferences may be assigned a tier. For example, a user furniture preference may indicate that the user prefers premium furniture. In some embodiments, one or more user preferences may include a specific brand or product. For example, the user preferences for appliances may indicate that the user prefers a particular appliance brand, or prefers that the accommodation includes an espresso machine.

The accommodation management system 130 searches 420 for accommodations that meet the minimum user preferences. The accommodation management system 130 may query an accommodation listing database 235 for accommodations that meet the minimum user preferences. The accommodation management system 130 may first search for accommodations that meet both minimum user preferences and flexible user preferences, and subsequently search for accommodations that meet the minimum user preferences but do not meet the flexible user preferences.

The accommodation management system 130 determines 430 that the accommodation listing database 235 does not have an accommodation that meets the minimum user preferences. The accommodation management system 130 may identify an accommodation that meets some, but not all of the minimum user preferences. The accommodation management system 130 may also identify an accommodation that is at least partially unfurnished but capable of being furnished to meet the minimum user preferences.

The accommodation management system reserves 440 an accommodation that is modifiable to meet the minimum user preferences. The accommodation management system 130 may select an accommodation that will require the least amount of cost to be modified to meet the minimum user preferences. In some embodiments, the accommodation management system 130 may determine that it is most efficient to reserve a fully furnished accommodation that does not meet some of the minimum user preferences (e.g., has a queen bed as opposed to a preferred king bed), and modify the fully furnished accommodation to meet the minimum user preferences. In some embodiments, the accommodation management system 130 may determine that it most efficient to reserve an unfurnished accommodation, and automatically generate instructions, e.g., to the vendor module 240, so that one or more vendors can furnish the accommodation to the minimum user preferences. Some accommodations may not be modifiable to the minimum user preferences. For example, a minimum user preference may be an ocean view, and some accommodations may not be capable of being modified to achieve an ocean view.

The accommodation management system 130 orders 450 automatically, in response to the reserving, furnishings to modify the accommodation to the minimum user preferences. The accommodation management system may identify the furnishings not currently present in the accommodation that are required to meet the minimum user preferences. The accommodation management system 130 may order the furnishings from one or more vendors via the vendor module 240. The accommodation management system 130 may connect to one or more vendor systems via APIs to order the furnishings. In some embodiments, the accommodation management system 130 may submit a request to multiple vendors for a furnishing, and the accommodation management system 130 may select a vendor that submits a lowest bid to provide the desired furnishing. The vendors may deliver and install the furnishing in the accommodation, and the accommodation may be provided to the user with at least the minimum user specifications.

FIG. 5 depicts an example process 500 for determining user preferences for a subscription living user. In this example, the accommodation management system 130 may parse 510 an accommodation review left by the user for an accommodation. The accommodation management system 130 may retrieve the review from the accommodation listing database 235. The review may indicate one or more items or features of the accommodation that the user liked or disliked.

The accommodation management system 130 may determine 520 an item type that the user mentioned in the review. For example, the review may mention that the user liked the linens or the appliances in the accommodation. The accommodation management system 130 may save a user preference for the item mentioned in the accommodation.

The accommodation management system 130 may identify 530 the specific item for the item type mentioned by the user. For example, the review may mention that the user liked "the sheets." However, the accommodation management system 130 may have further stored information regarding the sheets used at the accommodation. For example, the host of the accommodation may have previously input to the accommodation management system 130 detailed information regarding the features of the accommodation, such as the brand or characteristics of the features, including the brand and thread count of the sheets. In some embodiments, the accommodation management system 130 may have ordered one or more of the furnishings of the accommodation, such as the sheets, and thus the accommodation management system 130 may store the characteristics of the feature, including the brand and thread count of the sheets.

The accommodation management system 130 may determine 540 that the user will be staying in a subsequent accommodation. In some embodiments, the user may have already booked a specific subsequent accommodation. In some embodiments, the user may subsequently search for or request (explicitly or implicitly) a new accommodation.

The accommodation management system 130 may provide 550 for display to the user a rendering of the specific item superimposed on an image of the subsequent accommodation. The accommodation management system may retrieve the image of the subsequent accommodation from the accommodation listing database 235. The accommodation management system 130 may retrieve the image of the specific item from a listing of the reviewed accommodation in the accommodation listing database 235, or from any other available source, such as a manufacturer website for the specific item. The accommodation management system 130 may superimpose the image of the specific item on the image of the subsequent accommodation. In some embodiments, the image of the subsequent accommodation may comprise a plurality of item type tags indicating the location of item types in the image. The accommodation management system 130 may superimpose the image of the specific item over an item in the image of the subsequent accommodation having the same item type as the specific item.

The accommodation management system 130 may transmit 560 automatically in response to the user booking the subsequent accommodation, a request to a vendor to provide the specific item for the subsequent accommodation. In some embodiments, in response to the user checking out of the subsequent accommodation, the accommodation management system 130 may automatically transmit a request to the vendor to collect the specific item. In some embodiments, the accommodation management system 130 may order the specific item from a vendor for an accommodation previously booked by the user. In some embodiments, the user may search for a new accommodation, and the accommodation management system 130 may suggest or improve the search rank of accommodations that already have the specific item. The accommodation management system 130 may indicate to the user that the specific item is available to be provided at accommodations that do not currently have the specific item. Thus, the accommodation management system 130 may provide an appreciated item at future accommodations for the user without a specific request from the user. The accommodation management system 130 may monitor future reviews left by the user and determine whether the inferred user preference for the specific item was accurate, and the accommodation management system 130 may adjust the user preferences in response to the determination.

FIG. 6 depicts an example process 600 for connecting similar subscription living users, in accordance with one or more embodiments. In this example, the accommodation management system 130 may receive 610 a request from a requesting subscription living user to connect to a similar subscription living user. The request may include a question for the similar user. In some embodiments, the accommodation management system 130 may infer a request to connect to a similar user in response to an action, such as in response to a requesting user booking an accommodation.

The accommodation management system 130 executes 620 a similarity algorithm to identify similar subscription living users. The similarity algorithm may calculate a similarity score between pairs of users. The accommodation management system 130 may identify one or more similar users with the highest similarity to the requesting user. The accommodation management system 130 may determine a location or series of locations that the requesting user is planning on visiting. The accommodation management system 130 may identify similar users who have previously visited the location or series of locations. The accommodation management system 130 may identify one or more similar users with the highest similarity to the requesting user who have previously visited the location or series of locations.

The accommodation management system 130 may transmit 630 a link to the requesting subscription living user for display on a client device of the requesting subscription living user. The link may enable the requesting subscription living user to contact a similar subscription living user of the one or more similar subscription living users without providing personally identifiable information of the similar subscription living user. The accommodation management system 130 may provide information regarding shared characteristics and preferences between the users. The accommodation management system 130 may provide for display of previous reviews left by the similar subscription living user related to the shared characteristics or preferences between the users.

The accommodation management system 130 connects 640 in response to an input from the requesting subscription living user to the client device, the requesting user to one or more similar subscription living users. The accommodation management system 130 may provide a similar user's contact information to the requesting user for display on a user interface of the requesting user's client device if the similar user grants permission to the accommodation management system 130. In response to receiving the request, the accommodation management system 130 may transmit a notification to the similar user querying whether they would like to connect to the requesting user. The accommodation management system 130 may transmit a link to the requesting user's client device that allows the requesting user to transmit a message via the accommodation management system 130, text, call, or email the similar user without providing the actual email address or phone number of the similar user. The accommodation management system 130 may also provide the requesting user with a list of matched characteristics between the requesting user and the similar user which may assist the requesting user in initiating a conversation and asking relevant questions to the similar user. The accommodation management system 130 may provide previous reviews left by the similar user that are related to one or more of the matched characteristics.

The accommodation management system 130 may transmit a question from the requesting user to the similar user and relay a response to the requesting user without establishing a direct connection between the requesting user and the similar user. The accommodation management system 130 may create a group chat between the requesting user and one or more similar users. Once connected, the requesting user and the similar users may be able to freely share information between each other to assist the requesting user in improving their travel experience.

FIG. 7 illustrates an example process 700 for auto-listing a host accommodation of a subscription living user, in accordance with one or more embodiments. In this example, accommodation management system 130 may book 710 an accommodation in the accommodation listing database 235 for a travel itinerary. The booking may include a start and/or an end date.

The accommodation management system 130 may locate 720 in the accommodation listing database 235 and in response to the booking, a record of a host accommodation of the subscription living user. The host accommodation of the subscription living user is an accommodation owned or managed by the subscription living user (e.g., a primary residence), which the subscription living user may wish to make available for rent via the accommodation management system 130 when not being used by the subscription living user. The accommodation management system 130 may determine based on the record that the user's host accommodation may be rented to other guests. When the host accommodation is unavailable, such as when the subscription living user is staying in their accommodation, the accommodation listing database 235 may make the record inactive, such the record is not searchable by other users.

The accommodation management system 130 may modify 730 automatically in response to the booking, a status of the record in the accommodation listing database 235 to be a searchable record. Thus, the accommodation management system 130 may present the user's host accommodation in searches by other users as an available accommodation for the duration of the booking. In some embodiments, the accommodation management system 130 may automatically list the user's host accommodation as available in response to determining that the user has booked a different accommodation. In some embodiments, the accommodation management system 130 may transmit a notification to the user asking if the user would like the accommodation management system to list the user's host accommodation as available for the duration of the user's booking at a different accommodation.

The accommodation management system 130 may adjust 740 the status of the record in response to the subscription living user making a change to the user's travel itinerary. For example, in response to the user extending the length of an accommodation, or booking an additional accommodation, the accommodation management system 130 may automatically increase the length of availability of the user's host accommodation. In contrast, in response to the user cancelling or checking out of an accommodation during a period where the user's host accommodation is an active listing, the accommodation management system may automatically terminate any remaining availability of the user's host accommodation. If the user's residence is actively being rented by guests, the accommodation management system 130 may inform the guests that the booking is ending, and the accommodation management system 130 may provide a different accommodation for the guests.

Additional Configuration Considerations

The disclosed configuration beneficially provides an automated configuration for managing and executing subscription living accommodations. This removes or significantly reduces the need for user intervention, but ensures that the user receives adequate accommodations and that accommodations are booked automatically as needed for the user.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing accommodations for subscription living, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   determining, from an accommodation listing database, a plurality of reviews for previous accommodations selected by a particular user, each review of the plurality of reviews having metadata reflecting that the review was authored by the particular user;
   detecting favorable comments for an item type mentioned in at least one review of the plurality of reviews for previous accommodations selected by the particular user by parsing the plurality of reviews using a natural language processing system;
   identifying a specific item for the item type mentioned in the at least one review by accessing data stored in the accommodation listing database for a specific accommodation corresponding to the at least one review and matching metadata in the data for the specific accommodation to the item type;
   providing, for display on a computing device corresponding to the particular user, a rendering of the identified specific item superimposed on an image of a subsequent accommodation that the particular user is viewing on the computing device by superimposing the rendering of the identified specific item over an item in the image of the subsequent accommodation having a same item type as the identified specific item; and
   automatically transmitting in response to the particular user booking the subsequent accommodation, a request to a vendor to provide the identified specific item for the subsequent accommodation.

2. The computer-implemented method of claim 1, further comprising transmitting, automatically in response to the particular user checking out of the subsequent accommodation, a request to the vendor to collect the specific item.

3. The computer-implemented method of claim 1, further comprising identifying the specific item based on an accommodation management system previously providing the specific item.

4. The computer-implemented method of claim 1, wherein the identifying of the specific item comprises identifying a brand of the specific item.

5. The computer-implemented method of claim 1, further comprising ordering the specific item from a vendor for an accommodation previously booked by the particular user.

6. The computer-implemented method of claim 1, further comprising improving a search rank of accommodations for the particular user that include the specific item.

7. The computer-implemented method of claim 1, further comprising indicating to the particular user that the specific item is available to be provided at an accommodation that does not currently have the specific item.

8. The computer-implemented method of claim 1, further comprising monitoring future reviews left by the particular user regarding the specific item.

9. The computer-implemented method of claim 1, wherein before automatically transmitting the request to the vendor to provide the identified specific item, the method comprises:
  receiving input to the rendering of the identified specific item superimposed on the image indicating that the identified specific item is approved for the particular user.

10. The computer-implemented method of claim 9, wherein the input is received via an interaction with the rendering of the identified specific item superimposed on the image on a touchscreen user interface.

11. A non-transitory computer-readable medium comprising instructions encoded thereon for determining a preference of a subscription accommodation user, the instructions, when executed by one or more processors, causing the one or more processors to perform operations comprising:
  determining, from an accommodation listing database, a plurality of reviews for previous accommodations selected by a particular user, each review of the plurality of reviews having metadata reflecting that the review was authored by the particular user;
  detecting favorable comments for an item type mentioned in at least one review of the plurality of reviews for previous accommodations selected by the particular user by parsing the plurality of reviews using a natural language processing system;
  identifying a specific item for the item type mentioned in the at least one review by accessing data stored in the accommodation listing database for a specific accommodation corresponding to the at least one review and matching metadata in the data for the specific accommodation to the item type;
  providing, for display on a computing device corresponding to the particular user, a rendering of the identified specific item superimposed on an image of a subsequent accommodation that the particular user is viewing on the computing device by superimposing the rendering of the identified specific item over an item in the image of the subsequent accommodation having a same item type as the identified specific item; and
  automatically transmitting in response to the particular user booking the subsequent accommodation, a request to a vendor to provide the identified specific item for the subsequent accommodation.

12. The non-transitory computer-readable medium of claim 11, the operations further comprising instructions to transmit, automatically in response to the particular user checking out of the subsequent accommodation, a request to the vendor to collect the specific item.

13. The non-transitory computer-readable medium of claim 11, the operations further comprising instructions to identify the specific item based on an accommodation management system previously providing the specific item.

14. The non-transitory computer-readable medium of claim 11, the operations further comprising instructions to order the specific item from a vendor for an accommodation previously booked by the particular user.

15. The non-transitory computer-readable medium of claim 11, the operations further comprising instructions to improve a search rank of accommodations for the particular user that include the specific item.

16. The non-transitory computer-readable medium of claim 11, the operations further comprising instructions to indicate to the particular user that the specific item is available to be provided at an accommodation that does not currently have the specific item.

17. The non-transitory computer-readable medium of claim 16, the operations further comprising instructions to monitor future reviews left by the particular user regarding the specific item.

18. A system for determining a preference of a subscription accommodation user, the system comprising one or more processors configured to execute instructions that cause the one or more processors to perform operations comprising:
  determining, from an accommodation listing database, a plurality of reviews for previous accommodations selected by a particular user, each review of the plurality of reviews having metadata reflecting that the review was authored by the particular user;
  detecting favorable comments for an item type mentioned in at least one review of the plurality of reviews for previous accommodations selected by the particular user by parsing the plurality of reviews using a natural language processing system;
  identifying a specific item for the item type mentioned in the at least one review by accessing data stored in the accommodation listing database for a specific accommodation corresponding to the at least one review and matching metadata in the data for the specific accommodation to the item type;
  providing, for display on a computing device corresponding to the particular user, a rendering of the identified specific item superimposed on an image of a subsequent accommodation that the particular user is viewing on the computing device by superimposing the rendering of the identified specific item over an item in the image of the subsequent accommodation having a same item type as the identified specific item; and
  automatically transmitting in response to the particular user booking the subsequent accommodation, a request to a vendor to provide the identified specific item for the subsequent accommodation.

19. The system of claim 18, the operations further comprising:
  determining, based on the at least one review, that the particular user liked the specific item.

20. The system of claim 18, the operations further comprising:
    transmitting automatically, in response to the particular user checking out of the subsequent accommodation, a request to the vendor to collect the specific item.

\* \* \* \* \*